April 30, 1929.  O. MARKLEIN  1,711,059
VEHICLE
Filed July 22, 1927  3 Sheets-Sheet 2
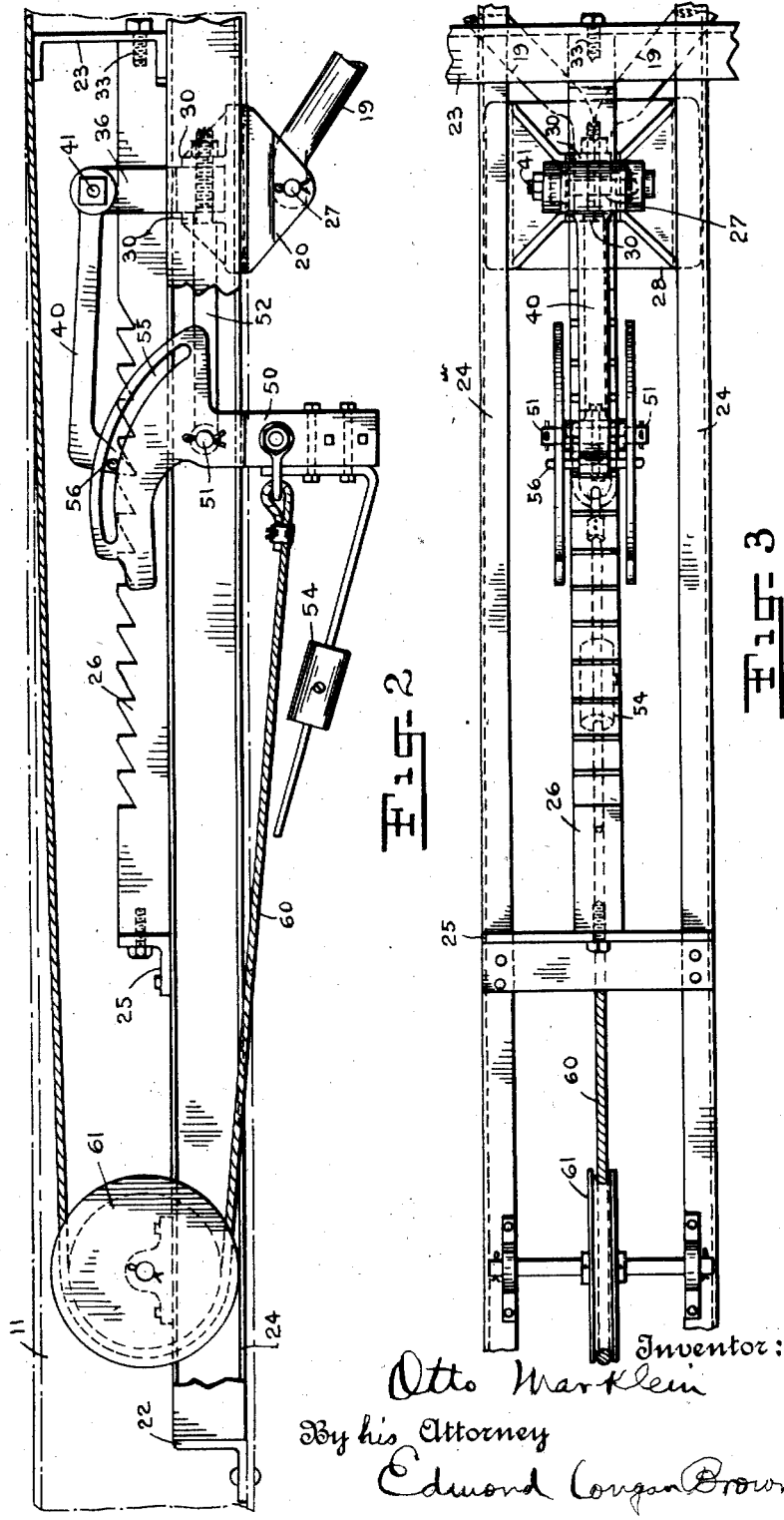

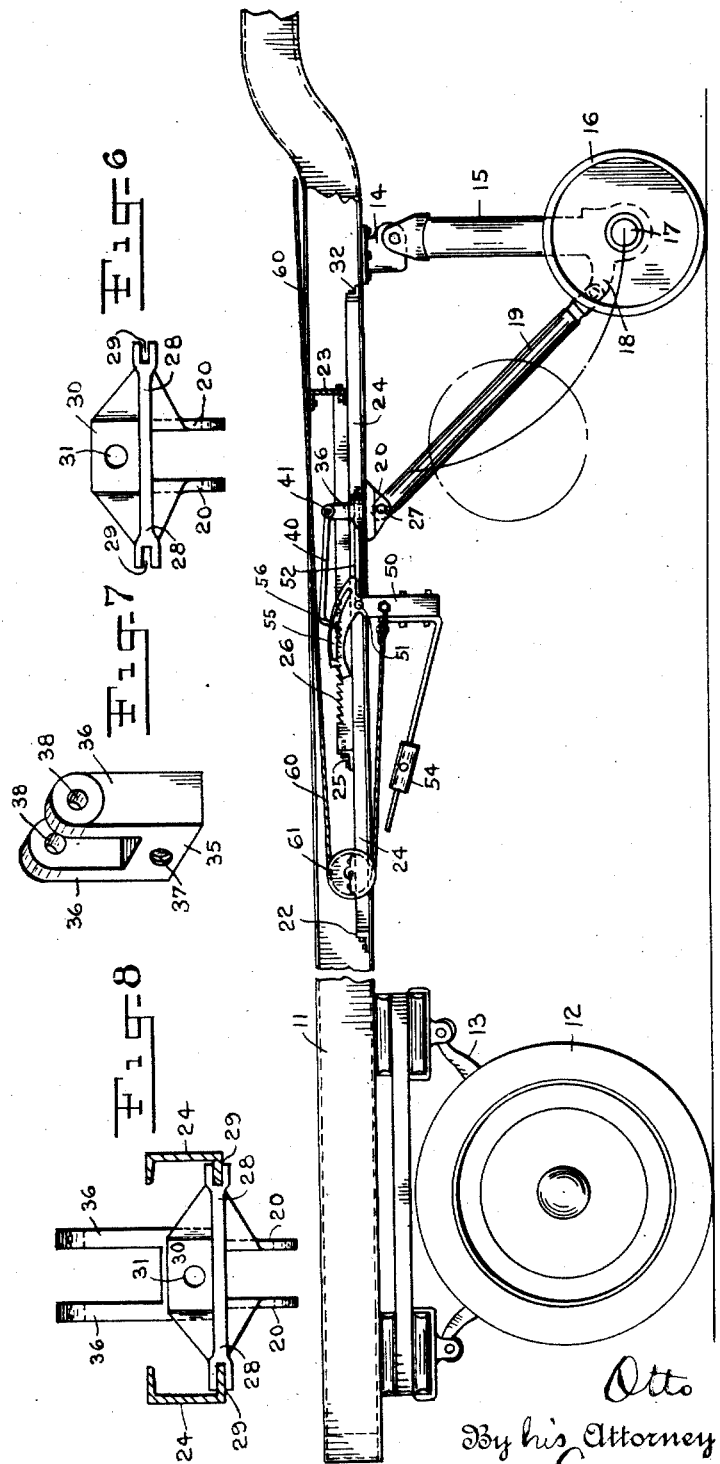

April 30, 1929. O. MARKLEIN 1,711,059
VEHICLE
Filed July 22, 1927 3 Sheets-Sheet 3

Inventor
Otto Marklein
By his Attorney
Edmond Congan Brown

Patented Apr. 30, 1929.

1,711,059

UNITED STATES PATENT OFFICE.

OTTO MARKLEIN, OF BROOKLYN, NEW YORK, ASSIGNOR TO WILLIAM R. BISHOP, OF BROOKLYN, NEW YORK.

VEHICLE.

Application filed July 22, 1927. Serial No. 207,762.

The invention relates to trailers such as are used in connection with a tractor, and capable of being temporarily coupled thereto or uncoupled therefrom, and relates particularly to means for supporting the forward end of such a trailer when the same is disengaged from its tractor.

One of the objects of the invention is to provide strong, simple and easily operated mechanism for the purposes above pointed out and others.

The invention consists in the novel construction, arrangement and combination of various devices, elements and parts, as set forth in the claims hereof, one embodiment of the same being illustrated in the accompanying drawings and described in this specification.

In the said drawings,

Fig. 1 is a side elevation of a trailer provided with my invention;

Fig. 2 is a similar view of a portion of Fig. 1 on an enlarged scale;

Fig. 3 is a plan view of Fig. 2;

Figs. 6, 7 and 8 are detail views herein described.

Figures 4, 5:
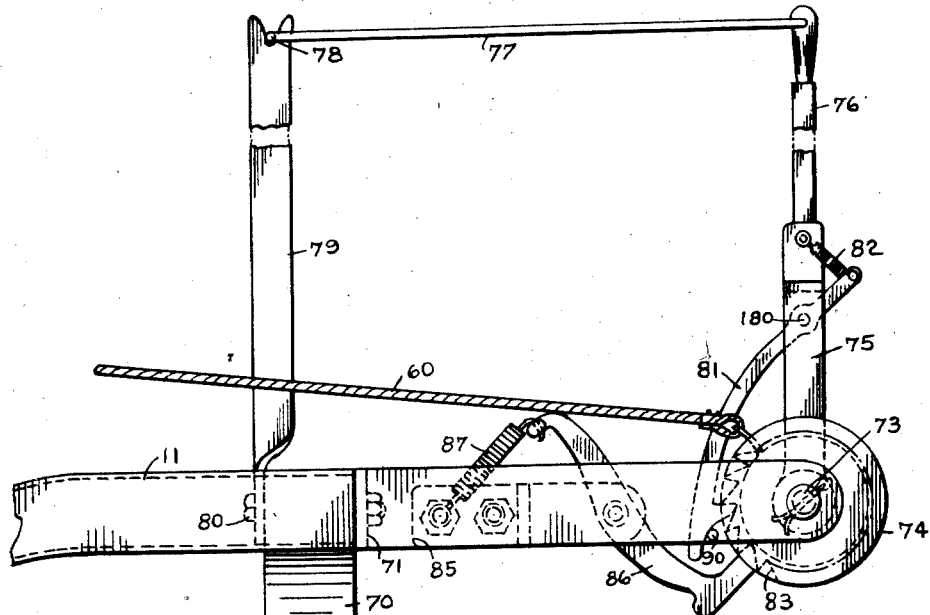
Fig. 4 is a side elevation on an enlarged scale of a portion of the invention comprising the winding drum hereinafter to be described.
Fig. 5 is a plan view of Fig. 4.

In carrying my invention into effect in the embodiment thereof which I have selected for illustration in the accompanying drawings and for description in this specification, I provide a trailer of the usual or any suitable type such as is adapted to be coupled on to a tractor and uncoupled therefrom in a manner which will be well understood. The devices for coupling and uncoupling the tractor and trailer form no part of the present invention and need not be here described, as the present invention relates primarily to the means provided to support the forward end of the trailer when it is uncoupled from the tractor, and to the means provided for raising said supporting means out of operative position when the tractor and trailer are coupled together, and allowing such supporting means to drop again into operative position when it is desired to support the forward end of the trailer independent of the tractor.

Referring more particularly to Fig. 1, 11 designates a part of the chassis frame of the trailer, 12 one of the rear wheels thereof, and 13 one of the supporting springs.

Near the front end of the chassis are provided downwardly extending brackets 14, one on each side, to each of which brackets is pivotally secured a support or leg 15, each of which supports or legs bearing at its lower end a wheel 16, said legs 15 and wheels 16, one on each side of the vehicle, being connected and braced together by a transverse rod 17, which may also serve as the axle for the wheels 16.

Extending rearwardly from the lower end of each leg 15 is a bracket 18 to which is pivotally secured one end of a rod 19, the other end of which extends upwardly and rearwardly and is pivotally secured to a sliding member, the lower portion only of which is seen in Fig. 1.

The sliding member above referred to is shown in detail in Figs. 6, 7 and 8. Fig. 6 is an elevation of the same looking endwise of Fig. 1, Fig. 7 is perspective view of an auxiliary member adapted to be assembled with the casting shown in Fig. 6, and Fig. 8 is a view looking in the same direction as in Fig. 6, showing the two castings shown in Figs. 6 and 7 assembled together and placed in the proper position in the vehicle, as now described.

The casting shown in Fig. 6 is provided with downwardly extending brackets 20, laterally extending members 28 each of which is provided with a groove 29, and with upwardly extending members 30 perforated as shown at 31. The grooves 29 are adapted to engage with the lower flanges of channel-irons 24, which are supported as follows: Extending across from one to the other of the side frames of the chassis are two transverse members 22 and 32, which will perhaps be better understood by reference to Fig. 1. These transverse members are angle-irons, each of which is bolted at each end to the respective lower flanges of the chassis side frames 11. To these transverse members 22 and 32 respectively are secured the rear and forward ends of the channel-irons 24. As will be seen from Fig. 1, these channel-irons 24 are considerably smaller in all their dimensions than the channel-irons 11 of the chassis frame, but as shown in Figs. 2 and 3 these channel-irons 24 are represented on a considerably enlarged scale so that they appear as large or larger than the chassis frame channel-irons in Fig. 1.

Extending across from one to the other of the smaller channel-irons 24, and bolted to the upper flanges thereof, is an angle-iron 25. This is best shown in Figs. 2 and 3, but its relation to the other part of the mechanism may be better understood by reference to Fig. 1. To this angle-iron 25 is bolted one end of a rack member 26, the other end of which is bolted at 33 to a channel-iron 23, which, similarly to the angle-iron 22, extends across between the chassis frame channel-irons 11, its middle portion passing over the smaller channel-irons 24.

The two rods 19 which extend upwardly and rearwardly from the brackets 18 of the legs 15, converge so that their upper ends are near together, and these upper ends are pivotally connected at 27 to the downwardly extending brackets 20 of the sliding member which has just been described.

In Fig. 7 is shown a member provided with a base 35 having a perforation 37, and two upwardly extending arms 36 each having a perforation 38. This member is assembled with the member shown in Fig. 6 by placing the same between the members 30 of Fig. 6 so that the perforations 37 and 31 in these two members register with each other. The appearance of the device when assembled is shown in Fig. 8, which figure will also make clear the relation of the assembled sliding member to the small channel frames 24, the lower flanges of which, as will be seen in Fig. 8, engage with the grooves 29. It will of course be understood that the members shown in Figs. 6 and 7, although shown and described as separate in this embodiment of my invention, may if desired be constructed as one integral casting.

As will be best seen in Fig. 2, but is also shown in Fig. 1, a pawl member 40 is pivotally secured at 41 between the upwardly extending members 36 of the sliding member, the free end of which pawl member is adapted to engage with the rack 26.

Pivotally mounted at 51 upon the end of a rod 52, the other end of which extends through the perforations 31 and 37 of the sliding member and is rigidly secured thereto, is a swinging member 50, the downwardly extending leg of which is provided with a slidably adjustable counterweight 54. This swinging member is provided in its upper flared-out portion with a slot 55 with which engages a pin 56 on the pawl 40, so that when the swinging member is rotated in a clockwise direction the pawl 40 will be lifted out of engagement with the rack 26. A cord 60 is secured to the leg 50 of the swinging member and passes rearwardly and over the pulley 61 and then forwardly to the winding drum mechanism shown in Figs. 4 and 5.

This winding mechanism is situated at the extreme forward portion of the trailer. It is not shown in Fig. 1, the extreme forward portion of the trailer being broken away for reasons of convenience and to save space, but this forward portion with the winding mechanism thereon is shown on a somewhat enlarged scale in Figs. 4 and 5. Upon referring to these figures, it will be seen that the chassis side frames 11 are continued forward at a somewhat higher elevation than is the portion shown in Fig. 1, the forward ends of the same being joined together by a transverse member 70. To this transverse member 70 is bolted the rear part of a frame 71, which has two forwardly extending members 72, in the forward ends of which is journaled a shaft 73 upon which is rigidly mounted the winding drum 74 to which is attached the forward end of the cord 60. One end of said shaft projects out beyond the frame member 72 and bears the mechanism for rotating said shaft and winding drum for the purpose of winding up the cord 60. This mechanism comprises a lever 75 the lower end of which is pivotally mounted upon the shaft 73 and the upper end of which may be provided for convenience in operation with a handle 76; to the upper end of this handle may be if desired pivotally attached a link 77 having at one end a loop 78 adapted to engage with the fork in the upper end of an upwardly extending member 79 the lower end of which is bolted at 80 to the transverse member 70, this link 77 being for the purpose of holding the lever 75 stationary in an upright position when desired.

To the lever 75 is pivotally attached at 180 a pawl 81, the upper end of which is connected by a spring 82 to the lever 75. This pawl 81 is adapted to engage with a rack 83 fast on the shaft 73.

Referring to Fig. 5 it will be seen that to one of the frame members 72 is bolted a bracket 85, to the forward end of which is pivotally secured a pawl 86, the forward end of which engages with the rack 83 and the rearward end of which is yieldably connected by a spring 87 to the frame member 72. It will be seen that by means of this mechanism, when the lever 75 is swung forwards the pawl 81 operates to rotate the winding drum 74 in a clockwise direction with respect to Fig. 4, but that when the lever 75 is swung back again to the vertical position as shown in Fig. 4, the reverse rotation of the winding drum 74 is prevented by the pawl 86, the pawl 81 meanwhile slipping backward over the rack 83 so as to get a hold on another portion of the same and continue the rotation when the lever is again swung forward. When winding up the cord 60 on the drum 74, the lever 75 must not be moved further back than the vertical position shown in Fig. 4, as by doing so the pawls would be released as described in the next paragraph.

When it is desired to allow the winding drum 74 to rotate backwards and unwind the cord 60, the lever 75 is moved backward so that the lower end of the pawl 81 is brought into contact with the pin 90 and thereby disengaged from the rack 83, and upon continuing the backward motion of the lever 75, the lower end of the pawl 81 strikes the lower portion of the pawl 86 and depresses it, thereby disengaging it also from the rack 83. The said rack being thus free to rotate in a counterclockwise direction, the weight of the wheels 16, arms 15, and other parts connected therewith draw the sliding member 20 forwards, drawing with it the cord 60 and thereby unwinding same from the drum 74.

The operation of the invention has already been to some extent alluded to in what has been above said as to the construction, but it may be well for the sake of clearness to briefly recapitulate the same. When the trailer, the greater portion of which is shown in Fig. 1, is loaded and is to be transferred to some other place by having its forward end coupled to a tractor, and when it is desired to elevate the devices for supporting the forward end of the trailer, the operator disengages the link 77 from the member 79, and reciprocates the lever 75 forward and backward, taking care, however, to not draw the lever 75 further back than the perpendicular position shown in Fig. 4. This reciprocating motion of the lever winds up the cord 60 upon the drum 74 in a manner which will be quite obvious, thereby drawing the member 50 rearward, thereby swinging the pawl 40 out of engagement with the rack 26, and upon the continued rearward motion of the member 50 the sliding member 20 draws the rods 19 backward, swinging the legs 15 and the wheels 16 upward into the position shown in dotted lines in Fig. 1. The lever 75 is then secured against accidental displacement by the link 77.

When it is desired to disengage the tractor from the trailer, it becomes necessary to provide a support for the forward end of the trailer, and this is done by drawing the lever 75 backwards so as to disengage the pawls 81 and 86 from the rack 83 in the manner which has been already explained, and allowing the cord 60 to unwind from the drum 74, whereupon the wheels 16 drop into place and support the forward end of the trailer, whereupon the tractor may be uncoupled and taken away.

The advantages of the invention will be obvious from what has been above said with regard to its construction and mode of operation.

Having thus described the invention, what is claimed as new and desired to be secured by Letters Patent is as follows:

1. In a trailer adapted to be used in connection with a tractor by which the front end of the trailer is supported and adapted also to be used free of said tractor, means adapted to support the front portion of said trailer when the same is free of said tractor, comprising in combination a leg swingingly connected to said trailer, a sliding member on said trailer, a link connecting said leg with said sliding member, a winding drum, a cable one end of which is secured to said sliding member and the other end to said drum, means adapted to rotate said drum in the winding direction when desired, means adapted to hold said drum stationary when desired, and means adapted to release said holding means and allow the cable wound upon said drum to unwind therefrom, said means comprising a shaft upon which said drum is fast, a circular rack also fast on said shaft, a pawl adapted to engage with said rack and hold the same against rotation in one direction, an operating lever pivotally mounted on said shaft, and a pawl pivotally mounted on said lever and adapted to engage with said rack and rotate the same when said lever is moved in one direction.

2. In a trailer adapted to be used in connection with a tractor by which the front end of the trailer is supported and adapted also to be used free of said tractor, means adapted to support the front portion of said trailer when the same is free of said tractor, comprising in combination a leg movably connected to said trailer, a sliding member on said trailer, a link connecting said leg with said sliding member, a winding drum, a cable one end of which is secured to said sliding member and the other end to said drum, means adapted to rotate said drum in the winding direction when desired, means adapted to hold said drum stationary when desired, and means adapted to release said holding means and allow the cable wound upon said drum to unwind therefrom, said means comprising a shaft upon which said drum is fast, a circular rack also fast on said shaft, a pawl adapted to engage with said rack and hold the same against rotation in one direction, an operating lever pivotally mounted on said shaft, a pawl pivotally mounted on said lever and adapted to engage with said rack and rotate the same when said lever is moved in one direction, and means adapted to disengage said pawls from said rack.

In witness whereof I have hereunto signed my name this 30th day of June, 1927.

OTTO MARKLEIN.